(12) United States Patent
Tanaka (10) Patent No.: US 8,259,204 B2
(45) Date of Patent: Sep. 4, 2012

(54) SOLID-STATE IMAGING DEVICE AND METHOD OF DRIVING THE SAME

(75) Inventor: Nagataka Tanaka, Kanagawa-ken (JP)

(73) Assignee: Kabushiki Kaisha Toshiba, Tokyo (JP)

(*) Notice: Subject to any disclaimer, the term of this patent is extended or adjusted under 35 U.S.C. 154(b) by 350 days.

(21) Appl. No.: 12/558,256

(22) Filed: Sep. 11, 2009

(65) Prior Publication Data

US 2010/0066879 A1 Mar. 18, 2010

(30) Foreign Application Priority Data

Sep. 12, 2008 (JP) ................ 2008-235142

(51) Int. Cl.
*H04N 3/14* (2006.01)
*H04N 5/335* (2011.01)

(52) U.S. Cl. ............... 348/300; 348/302; 348/308

(58) Field of Classification Search ............ 348/294, 348/297, 300, 302, 308, 312; 250/208.1; 257/290–292
See application file for complete search history.

(56) References Cited

U.S. PATENT DOCUMENTS

| | | | |
|---|---|---|---|
| 7,728,895 B2 * | 6/2010 | Tanaka et al. | 348/302 |
| 2006/0001751 A1 * | 1/2006 | Abe et al. | 348/300 |
| 2007/0103574 A1 * | 5/2007 | Tanaka | 348/308 |
| 2008/0303929 A1 * | 12/2008 | Morimoto et al. | 348/300 |

FOREIGN PATENT DOCUMENTS

| | | |
|---|---|---|
| JP | 2005-86595 | 3/2005 |
| JP | 2007-104186 | 4/2007 |
| JP | 2007-124344 | 5/2007 |
| JP | 2008-301378 | 12/2008 |
| WO | WO 2007/074549 A1 | 7/2007 |

OTHER PUBLICATIONS

Machine English Translation of JP 2007-104186 A (Apr. 19, 2005).*
U.S. Appl. No. 12/823,646, filed Jun. 25, 2010, Sato, et al.
U.S. Appl. No. 12/827,190, filed Jun. 30, 2010, Taruki, et al.
U.S. Appl. No. 12/859,826, filed Aug. 20, 2010, Matsuda.
Office Action issued Oct. 26, 2010, in Japan Patent Application No. 2008-235142.
U.S. Appl. No. 13/052,182, filed Mar. 21, 2011, Taruki, et al.
Keiki Mabuchi, et al., "CMOS Image Sensors Comprised of Floating Diffusion Driving Pixels With Buried Photodiode", Keiji Mabuchi, et al., IEEE Journal of Solid-State Circuits, vol. 39, No. 12, Dec. 2004.
Office Action issued on Mar. 1, 2011 in the corresponding Japanese Patent Application No. 2008-235142.
Woonghee Lee, et al., "A High S/N Ratio and High Full Well Capacity CMOS Image Sensor with Active Pixel Readout Feedback Operation", IEEE Asian Solid-State Circuits Conference, Nov. 12-14, 2007, Jeju, Korea, pp. 260-263.

* cited by examiner

*Primary Examiner* — Nelson D. Hernández Hernández
(74) *Attorney, Agent, or Firm* — Oblon, Spivak, McClelland, Maier & Neustadt, L.L.P.

(57) ABSTRACT

A solid-state imaging device includes a unit cell, a first power supply which supplies a drain voltage to the amplifying transistor, and a second power supply which supplies a drain voltage to the reset transistor. The unit cell includes a photodiode which accumulates a signal charge obtained by photoelectric conversion of incident light, an amplifying transistor which has a control electrode capacitively coupled to a vertical signal line, and which amplifies the signal charge outputted from the photodiode and outputs the amplified signal charge to the vertical signal line, and a reset transistor which resets a voltage at the control electrode of the amplifying transistor.

19 Claims, 4 Drawing Sheets

SOLID-STATE IMAGING DEVICE AND METHOD OF DRIVING THE SAME

CROSS-REFERENCE TO RELATED APPLICATIONS

This application is based upon and claims the benefit of priority from the prior Japanese Patent Application No. 2008-235142, filed Sep. 12, 2008, the entire contents of which are incorporated herein by reference.

BACKGROUND

1. Technological Field

Embodiments discussed herein relate to a solid-state imaging device and a method of driving the same and is applicable to a CMOS image sensor, for example.

2. Description of the Related Art

A so-called three-transistor complementary metal oxide semiconductor (3Tr CMOS) image sensor has heretofore been known as an example of a CMOS image sensor. A cell size for a unit cell (PIXEL) has been reduced in the CMOS image sensor of this type. The reduction in the cell size, however, leads to a reduction in area occupied by a gate electrode of an amplifying transistor, and consequently leads to a reduction in capacitance of a floating diffusion (FD) for each cell. A charge quantity Q that can be stored in the floating diffusion is expressed by Q=C×Vfd (where C denotes gate capacitance of the amplifying transistor while Vfd denotes a voltage at the floating diffusion). Accordingly, assuming that the voltage Vfd is constant, a problem arises in that the charge quantity Q that the floating diffusion can handle is reduced in proportion to a reduction in the gate capacitance C.

A method for solving this problem has been disclosed by Mabuchi et al. in the IEEE in 2004 (see, for example, "CMOS Image Sensors Comprised of Floating Diffusion Driving Pixels With Buried Photodiode", IEEE JOURNAL OF SOLID-STATE CIRCUITS, VOL. 39, NO. 12, DECEMBER 2004, which will be referred to as Non-patent Document 1 below). According to the Non-patent Document 1, a voltage at a floating diffusion is made (is boosted) to be higher than a drain voltage so that the handled charge quantity Q is increased.

Now, a conventional solid-state imaging device will be described using the Non-patent Document 1 as an example.

Figure 4A:
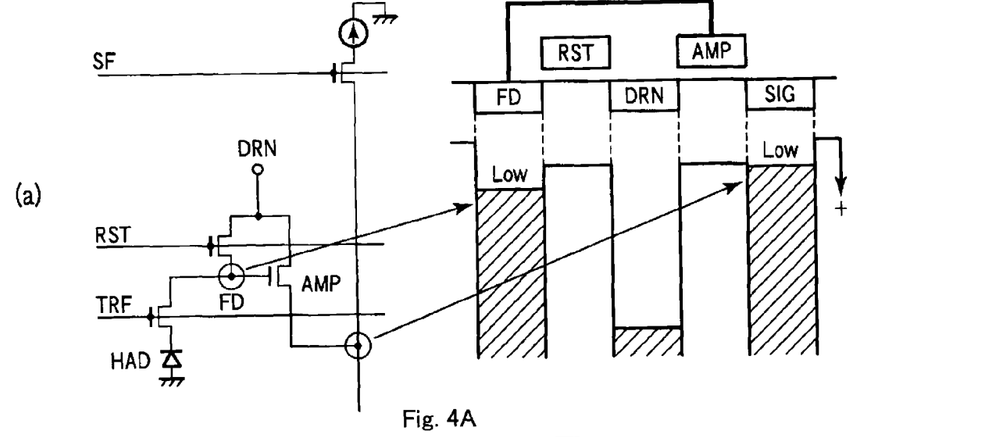
FIG. 4A is a potential diagram of a conventional solid-state imaging device.

FIG. 4(a), from the above-mentioned Non-patent Document 1, is a potential diagram immediately after a gate of a reset transistor RST is set to a high level and the reset transistor RST is turned on (see FIG. 4A, for example). Since the reset transistor RST is turned on, a voltage at the floating diffusion FD is substantially equal to the channel potential of the reset transistor RST Meanwhile, a voltage at a vertical signal line SIG is boosted reflecting the voltage at the floating diffusion FD. Here, boosting time is determined by the capacitance to ground of the vertical signal line SIG and current supply capability of a Load transistor. Accordingly, a relatively long time period is necessary for making the voltage at the vertical signal line SIG steady. That is, the voltage at the signal line SIG is not yet steady at a time point shown in FIG. 4(b), and is slightly higher than at a time point shown in FIG. 4(a) (see FIG. 4B, for example).

Figure 4B:
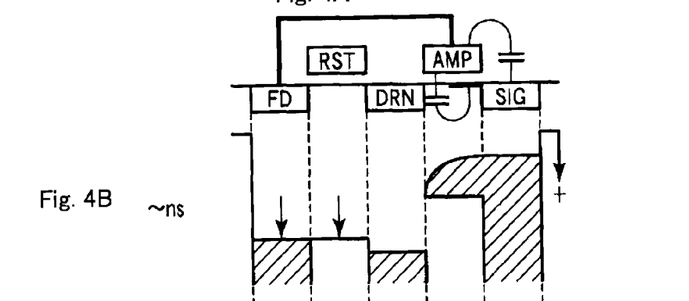
FIG. 4B is a potential diagram of a conventional solid-state imaging device.
Figure 4C:
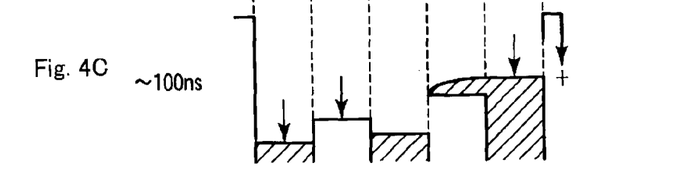
FIG. 4C is a potential diagram of a conventional solid-state imaging device.

Subsequently, FIG. 4(c) is a potential diagram when the voltage at the vertical signal line SIG comes to a steady state a little while after the reset transistor RST is turned on. The floating diffusion FD in FIG. 4(c) is in a floating state after the voltage at the gate comes to substantially the same value as the channel potential of the reset transistor RST. For this reason, when the voltage at the vertical signal line SIG is changed, the floating diffusion FD has a higher voltage through a gate capacitance of an amplifying transistor AMP and the voltage at the floating diffusion FD is eventually boosted to a voltage higher than a drain voltage DRN.

Here, the change in the voltage at the floating diffusion FD in the transition from the time point in FIG. 4(b) to the potential state in FIG. 4(c) is known to be expressed by the following formula (1):

$$\Delta V_{fd} = \frac{\frac{2}{3}C_{amp}}{\frac{2}{3}C_{amp} + C_{fd}} \Delta V_{sig} \qquad (1)$$

Here, ΔVsig is a change amount of the voltage at the vertical signal line SIG in the transition from the time point in FIG. 4(a) to the potential state in FIG. 4(c), and Camp is the gate capacitance of the amplifying transistor AMP.

Here, the reason for multiplying Camp by a coefficient "⅔" in the above formula (1) is that there is a potential difference between the drain (DRN) and the source (SIG) of the amplifying transistor AMP at the time point in FIG. 4(b) and the amplifying transistor AMP is therefore operated in a pentode region (a saturated region). For example, FIG. 4(b) illustrates how ⅔ of the gate capacitance of the amplifying transistor AMP contributes to a boosting operation.

As described above, according to the conventional solid-state imaging device, the amplifying transistor is operated in the pentode region at the time of the boosting operation. For this reason, only the two-thirds of the gate capacitance of the amplifying transistor can contribute to the boosting operation. That is to say, the conventional solid-state imaging device has a disadvantageous structure in terms of an increase in the charge amount to be stored in the floating diffusion. This disadvantage becomes more apparent when the space occupied by the gate electrode of the amplifying transistor is reduced along with the size reduction of the unit cell.

SUMMARY OF THE INVENTION

An exemplary embodiment described herein provides a solid-state imaging device including a unit cell including a photodiode which accumulates a signal charge obtained by photoelectric conversion of incident light, an amplifying transistor which has a control electrode capacitively coupled to a vertical signal line, and which amplifies the signal charge outputted from the photodiode and outputs the amplified signal charge to the vertical signal line, and a reset transistor which resets a voltage at the control electrode of the amplifying transistor, a first power supply which supplies a drain voltage to the amplifying transistor, and a second power supply which supplies a drain voltage to the reset transistor.

Another exemplary embodiment described herein provides a method of driving a solid-state image device including setting a first power supply, which supplies a drain voltage to a first amplifying transistor of the imaging device, and a voltage at a first vertical signal line of the imaging device, to a low level; setting a second power supply, which supplies a drain voltage to a first reset transistor of the imaging device, to a high level; turning on the first reset transistor on a first selection line so as to reset a voltage at a control electrode of the first amplifying transistor; turning off the first reset transistor on the first selection line, and increasing the first power supply and a voltage at the first vertical signal line so as to change the voltage at the control electrode of the first amplifying transistor on the first selection line.

Another exemplary embodiment described herein pertains to a computer readable storage medium encoded with instructions, which when executed by a computer causes the computer to implement a method of driving a solid-state imaging device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Various other objects, features and attendant advantages of the exemplary embodiments described herein will be more fully appreciated from the following detailed description when considered in connection with the accompanying drawings in which like reference characters designate like or corresponding parts throughout the several views.

Exemplary embodiments will be described below with reference to the drawings. It should be noted that the drawings are not to scale. Accordingly, the dimensions and ratios in the drawings are different from the actual ones. It should also be understood as a matter of course that dimensions and ratios may partially differ between different figures. Particularly, the embodiments shown in the drawings only illustrate an exemplary device and an exemplary method for realizing a technical advancement; hence, the technical advancement is not necessarily specified by the shape, structure or arrangement of the constituents in the embodiments. Various modifications may be made on the technical advancement.

First Exemplary Embodiment

Figure 1:
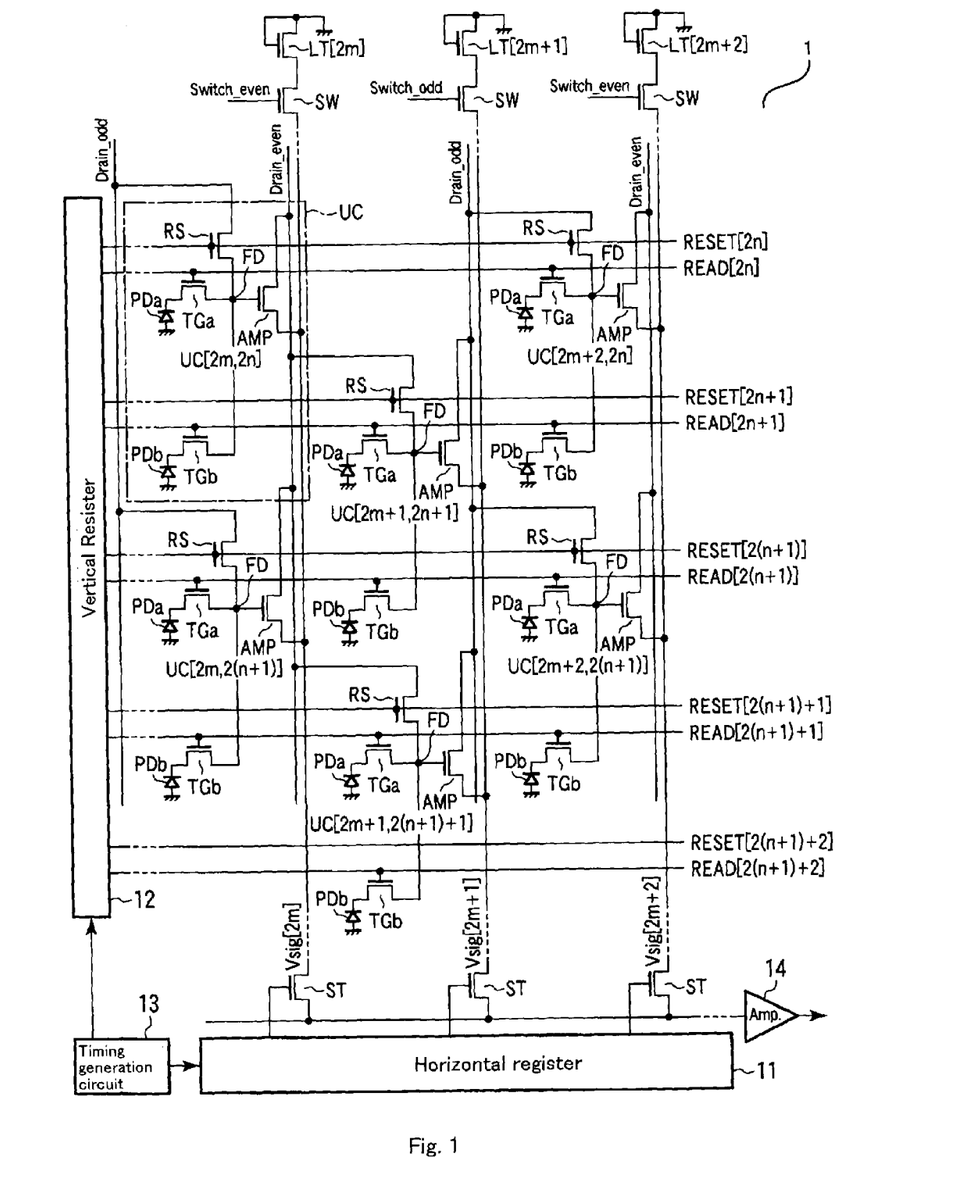
FIG. 1 is a circuit diagram showing an exemplary configuration of a solid-state imaging device (a CMOS image sensor) according to a first embodiment.

FIG. 1 shows a configuration example of a solid-state imaging device. Here, a 3Tr CMOS image sensor having a two-pixel one-cell structure will be described as an example of the solid-state imaging device.

As shown in FIG. 1, the CMOS image sensor 1 includes multiple unit cells UC, multiple load transistors LT, multiple horizontal select transistors ST, a horizontal register 11, a vertical register 12, a timing generation circuit 13, an amplifier (Amp.) 14, and so forth. The multiple unit cells US are arranged in an array ranging from "2n to 2(n+1)+2" lines and "2m to 2m+2" columns, for example. Each of the unit cells UC includes photodiodes (pixels) PDa and PDb, (a pair of) transfer (read) transistors TGa and TGb, a reset transistor RS, and an amplifying transistor AMP (the two-pixel one-cell structure).

Specifically, in each of the unit cells UC, an anode of the photodiode PDa is grounded and a cathode thereof is connected to one end of a current path of the transfer transistor TGa. Meanwhile, an anode of the photodiode PDb is grounded and a cathode thereof is connected to one end of a current path of the transfer transistor TGb. Read signal lines READ are respectively connected to gates of the transfer transistors TGa and TGb to receive read signals from the vertical register 12. The other ends of the current paths of the transfer transistors TGa and TGb are connected in common to a gate (a control electrode) of the amplifying transistor AMP. A junction of the other ends of the current paths of the transfer transistors TGa and TGb with the gate of the amplifying transistor AMP constitutes a floating diffusion (FD).

A current path of the reset transistor RS is connected between the gate of the amplifying transistor AMP and a voltage supply source DRAIN (such as Drain_odd). A reset signal line RESET is connected to a gate of the reset transistor RS to receive a reset signal from the vertical register 12.

One end of a current path of the amplifying transistor AMP is connected to a vertical signal line Vsig while the other end thereof is connected to a voltage supply source (such as Drain_even). The vertical signal line Vsig has its one end connected to one end of a current path of the horizontal select transistor ST and is disposed in a direction intersecting with the reset signal line RESET and the read signal line READ. The other end of the vertical signal line Vsig is connected to the load transistor LT via a switching transistor SW.

The other end of the current path of the horizontal select transistor ST is connected to the amplifier 14. A gate of the horizontal select transistor ST is connected to the horizontal register 11 to receive a horizontal select pulse from the horizontal register 11.

The horizontal register 11 and the vertical register 12 are controlled by the timing generation circuit 13.

Here, among the unit cells UC arranged in the "2m to 2m+2" columns, unit cells UC arranged on an even-numbered column are displaced by "one line" from unit cells UC arranged on an odd-numbered column, for example. For instance, the unit cells UC arranged on the "2m and 2m+2" columns are disposed on the "2n" line and the "2(n+1)" line. Meanwhile, the unit cells UC arranged on the "2m+1" column are disposed on the "2n+1" line and the "2(n+1)+1" line.

While the layout of the unit cells US is defined as two lines by three columns in this example, the actual CMOS image sensor includes more unit cells US arranged therein.

Figure 2:
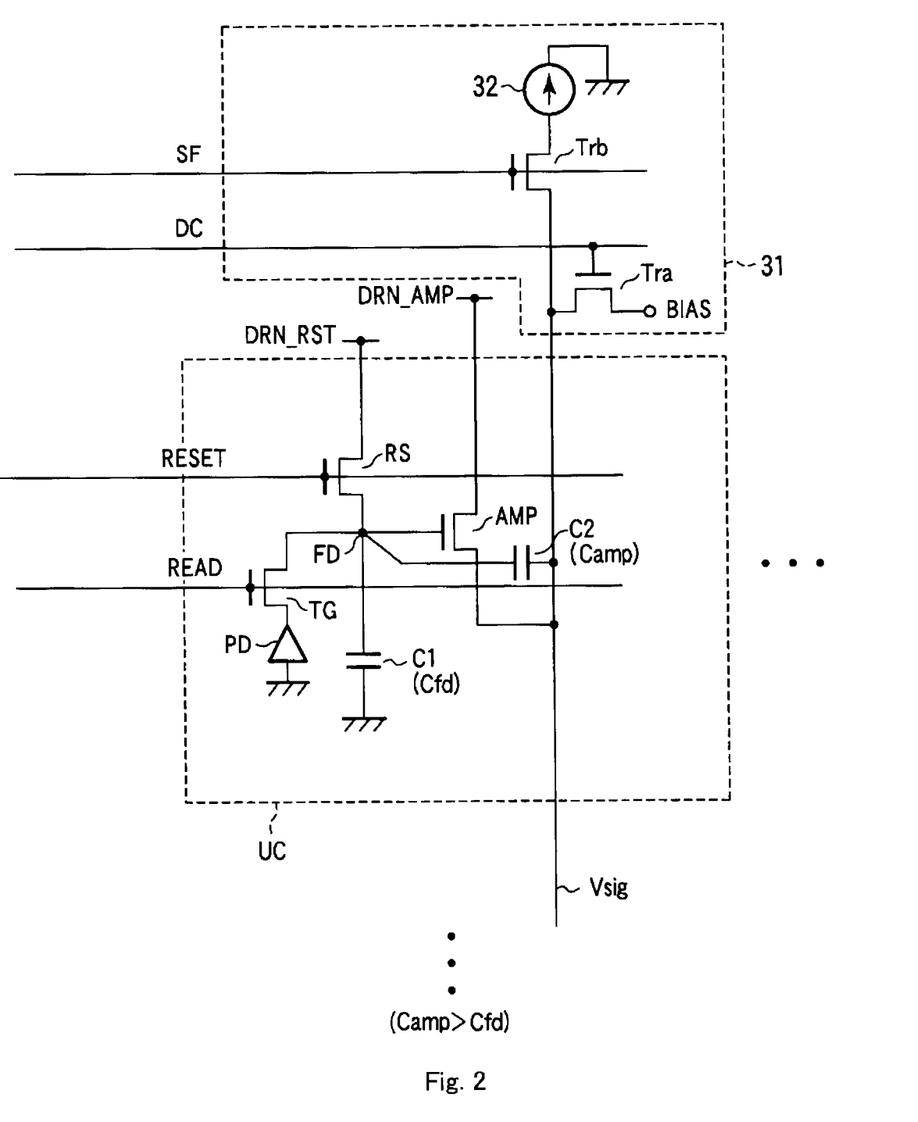
FIG. 2 is a circuit diagram showing an exemplary configuration of a unit cell in the CMOS image sensor.

FIG. 2 shows a configuration example of the unit cell UC in a pixel region of the CMOS image sensor. Here, a description is given of a case in which a selected unit cell to which the reset signal is supplied has a one-pixel one-cell structure.

As shown in FIG. 2, this unit cell UC is equivalent to a pixel of a 3Tr CMOS image sensor having so-called a one-pixel one-cell structure, which includes a photodiode PD, an amplifying transistor AMP, a transfer transistor TG, and a reset transistor RS.

The photodiode PD is configured to accumulate charges obtained by photoelectrically converting incident light. The amplifying transistor AMP is configured to amplify a voltage at a floating diffusion FD and to output the amplified voltage to a vertical signal line Vsig. Specifically, a gate of the amplifying transistor AMP is connected to the floating diffusion FD, a source thereof is connected to the vertical signal line Vsig, and a drain thereof is connected to a voltage supply source DRN_AMP which is a first power supply.

The transfer transistor TG is configured to control an accumulation of the charges of the photodiode PD. A gate of the transfer transistor TG is connected to a read signal line READ, a source thereof is connected to an anode of the photodiode PD, and a drain thereof is connected to the floating diffusion FD.

The reset transistor RS is configured to reset a gate voltage (a voltage at the floating diffusion FD) of the amplifying transistor AMP. A gate of the reset transistor RS is connected to a reset signal line RESET, a source thereof is connected to the floating diffusion FD, and a drain thereof is connected to a voltage supply source DRN_RST which is a second power supply.

Here, a capacitance value of the capacitance C1 to ground of the floating diffusion FD is indicated with Cfd while a capacitance value of gate capacity C2 between the floating diffusion FD and the vertical signal line Vsig is indicated with Camp (where Camp>Cfd holds true). Camp includes a first capacitance of gate capacity of the amplifying transistor AMP and a second capacitance between the amplifying transistor AMP and the vertical signal line Vsig. The first and second capacitances depend on a capacitance area and a distance between electrodes as expressed in $C = \in S/d$. Here, $\in$ is a dielectric constant, S is the capacitance area, and d is the distance between electrodes. To increase a capacitance, the distance between electrodes may be decreased, and the capacitance area may be increased. The first capacitance has an enough small distance between electrodes because the distance corresponds to a gate insulating film of the amplifying transistor AMP. On the other hand, it is difficult for the second capacitance to decrease the distance between electrodes, compared to the first capacitance. TO increase the second capacitance, the second capacitance needs to increase the capacitance area of the second capacitance. However, it is not preferable to increase the capacitance area in miniaturization. Therefore, it is favorable that the first capacitance is greater than the second capacitance, preferably the first capacitance has more than 50% of Camp. Meanwhile, the unit cell US is further provided with a VSL control circuit 31 configured to control the voltage at the vertical signal line Vsig. The VSL control circuit 31 includes a control signal line DC, a biasing transistor Tra, a select signal line SF, a load transistor Trb, and a current source 32.

The biasing transistor Tra is configured to fix the voltage at the vertical signal line Vsig. Specifically, a gate of the biasing transistor Tra is connected to the control line DC, a source thereof is connected to a power supply BIAS, and a drain thereof is connected to the vertical signal line Vsig.

On the other hand, a gate of the load transistor Trb is connected to the select signal line SF. A drain of the load transistor Trb is connected to one end of the current source 32 and a source thereof is connected to the vertical signal line Vsig. The other end of the current source 32 is grounded.

As described above, two types of the voltage supply sources DRN_AMP and DRN_RST are provided for the unit cell as the power voltage supply sources. For example, as shown in FIG. 1, the voltage supply source DRN_RST, being as the Drain_odd, is connected to the drains of the respective reset transistors RS in the unit cells UC corresponding to the vertical signal line Vsig on the even-numbered columns, so as to supply a second drain voltage DRAIN (DRN_RST). Meanwhile, the voltage supply source DRN_AMP, being as the Drain_ even, is connected to the drains of the respective amplifying transistors AMP in the unit cells UC corresponding to the vertical signal line Vsig on the even-numbered columns, so as to supply a first drain voltage DRAIN (DRN_AMP). On the other hand, the voltage supply source DRN_RST, being as the Drain_even, is connected to the drains of the respective reset transistors RS in the unit cells corresponding to the vertical signal line Vsig on the odd-numbered column so as to supply the second drain voltage DRAIN (DRN_RST). Meanwhile, the voltage supply source DRN_AMP, as the Drain_odd, is connected to the drains of the respective amplifying transistors AMP in the unit cells corresponding to the vertical signal line Vsig on the even-numbered columns so as to supply the first drain voltage DRAIN (DRN_AMP).

Specifically, the CMOS image sensor 1 of the present embodiment includes, in the unit cell UC, two different voltage supply sources, the voltage supply source DRN_RST to be connected to the drain of the reset transistor RS, and the voltage supply source DRN_AMP to be connected to the drain of the amplifying transistor AMP. As a consequence, the CMOS image sensor 1 can supply different voltages DRAIN (DRN_AMP) and DRAIN (DRN_RST) separately to the amplifying transistor AMP and the reset transistor RS.

Now, a method of driving the CMOS image sensor according to the present embodiment will be described below.

Figure 3:
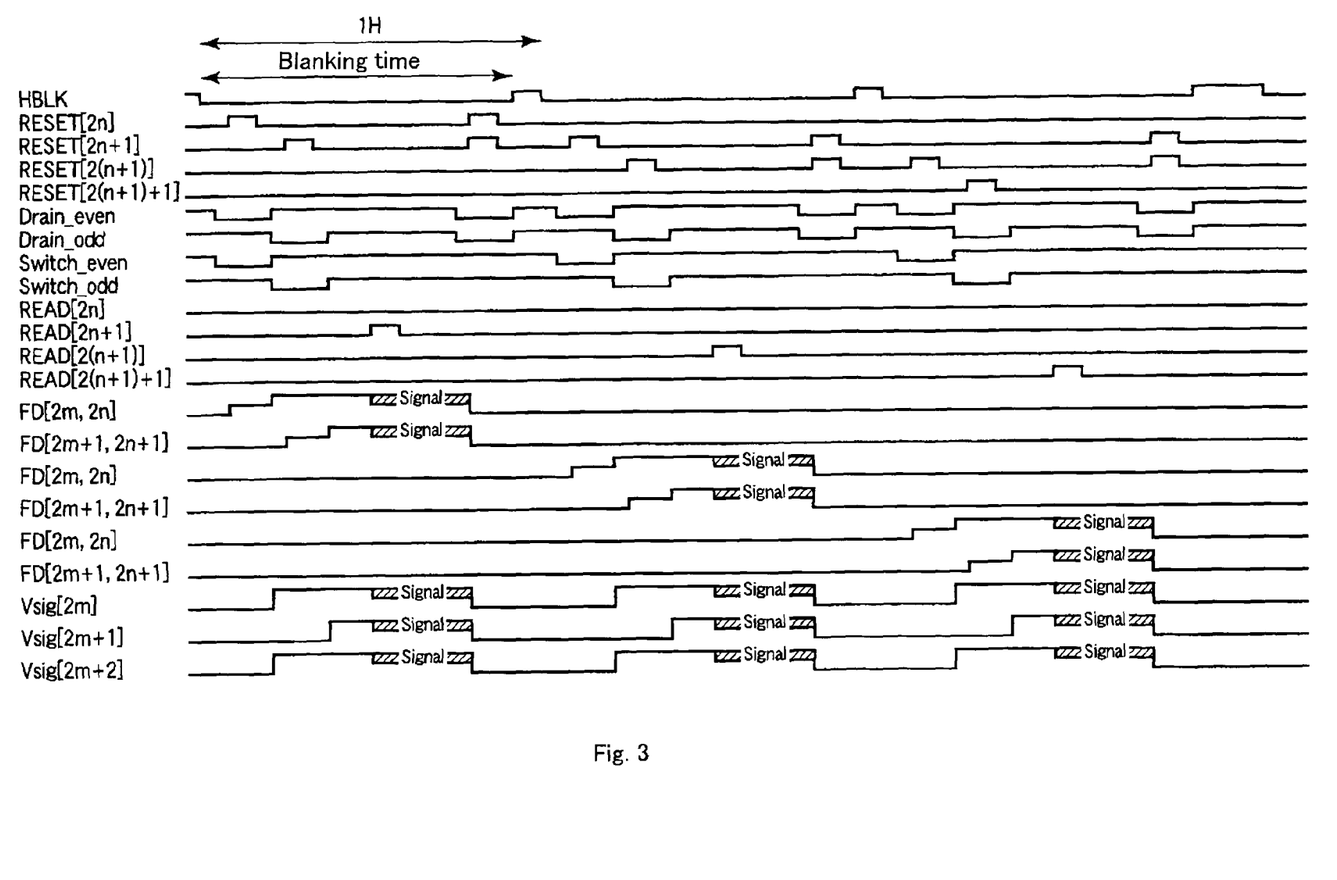
FIG. 3 is a timing chart for illustrating an exemplary operation of the CMOS image sensor.

FIG. 3 is a view for illustrating an operation example of the CMOS image sensor 1 having the configuration in FIG. 1. Here, description is given of operations of the CMOS image sensor 1 for reading the signal charges out of the respective photodiodes PDa and PDb in the unit cells UC [2m+1, 2n+1] on the "2n+1" line and in the unit cells UC [2m, 2(n+1)] and UC [2m+2, 2(n+1)] on the "2(n+1)" for example.

First, a voltage at a floating junction FD corresponding to the photodiode PDb on the "2n+1" line in the even-numbered column is reset by setting the reset signal line RESET [2n] to a high level. In this case, the voltage supply source Drain_odd is set to a high level (DRN_RST is on) whereas the voltage supply source Drain_even is set to a low level (DRN_AMP is off). Moreover, the vertical signal lines Vsig [2m] and Vsig [2m+2] corresponding to the even-numbered column are also set to a low level.

Next, the reset transistors RS of the unit cells UC [2m, 2n] and UC [2m+2, 2n] are turned off by setting the reset signal line RESET [2n] to a low level. After setting the voltage of the corresponding floating junctions FD to be in a floating state as described above, a switching transistor SW (Switch_even) and the voltage supply source Drain_even are set to a high level (DRN_AMP is on). In this way, a pixel source follower circuit including the load transistors LT [2m], LT [2m+2] and the respective amplifying transistors AMP are activated whereby the voltages of the vertical signal lines Vsig [2m] and Vsig [2m+2] are respectively raised to levels determined by the voltages of the floating junctions FD. At this time, the voltages of the floating junctions FD are higher in an amount expressed in the following formula (2) due to capacitive coupling respectively between the floating junctions FD and the vertical signal lines Vsig [2m] and Vsig [2m+2] (a boosting operation of the floating junctions FD utilizing capacitive coupling).

$$\Delta V_{fd} = \frac{C_{amp}}{C_{amp} + C_{fd}}(V_{sig} - BIAS) \quad (2)$$

Here, BIAS is equivalent to the low level of the voltage supply source Drain_even and Vsig is equivalent to an output level from the corresponding pixel source follower circuit. Note that the formula (2) is different from to the formula (1) in that the coefficient "⅔" is not in front of the gate capacitance Camp of the amplifying transistor AMP (the capacitance value of the gate capacity C2 between the floating diffusion FD and the vertical signal line Vsig).

Here, in the boosting operation, the voltage supply source Drain_even is set to the high level whereas the voltage supply source Drain_odd is set to the low level. This is because, this embodiment does not reset the voltages of the floating junctions FD to the high level if both of the voltage supply source Drain_even and the voltage supply source Drain_odd are set to the low level. On the other hand, if both of the voltage supply source Drain_even and the voltage supply source Drain_odd are set to the high level, the voltages of the vertical signal lines Vsig are set to the high level thereby making the boosting operation of the floating junctions FD utilizing the capacitive coupling difficult.

Next, the voltage at the floating junction FD corresponding to the photodiode PDa on the "2n+1" line in the odd-numbered column is reset by setting the reset signal line RESET [2n+1] to a high level. In this case, the voltage supply source Drain_even is set to a high level (DRN_RST is on) whereas the voltage supply source Drain_odd is set to a low level (DRN_AMP is off). Moreover, the vertical signal line Vsig [2m+1] corresponding to the odd-numbered column is also set to a low level.

Next, the reset transistors RS of the unit cell UC [2m+1, 2n+1] is turned off by setting the reset signal line RESET [2n+1] to a low level. After setting the voltage at the corresponding floating junction FD to be in a floating state as described above, a switching transistor SW (Switch_odd) and the voltage supply source Drain_odd are set to a high level (DRN_AMP is on). In this way, a pixel source follower circuit including the load transistors LT [2m+1] and the amplifying transistor AMP is activated whereby the voltage at the vertical signal lines Vsig [2m+1] is raised to a level determined by the voltage at the floating junction FD. At this time, the voltage at the floating junction FD is shifted to a higher voltage due to capacitive coupling between the floating junction FD and the vertical signal line Vsig [2m+1].

As a result of the boosting operation utilizing the capacitive coupling, the voltage at the floating junction FD can be easily set to a voltage higher than the voltage immediately after being reset by the reset transistor RS.

After these operations, voltage levels, determined by the voltages of the floating junctions FD, corresponding to the photodiodes PDa and PDb on the "2+1" line are outputted to the vertical signal lines Vsig [2m], Vsig [2m+1], and Vsig [2m+2]. Accordingly, these voltage levels are read out as dark levels.

Next, the transfer transistors TGa and TGb corresponding to the photodiodes PDa and PDb on the "2+1" line are turned on by setting the read signal line READ [2n+1] to a high level, and the signal charges accumulated in the photodiodes PDa and PDb are read out to the floating junctions FD. At this time, the amplifying transistors AMP connected to the floating junctions FD are modulated by the signal charges but stay at the high level. Accordingly, the signal charges in the photodiodes PDa and PDb on the "2+1" line are read out with the corresponding pixel source follower circuits kept in the activated state. Each value of the signal charges is equal to a sum of the dark level and a signal level. Therefore, it is possible to extract only the signal levels of the photodiodes PDa and PDb on the "2+1-th" line by obtaining differences between the signal charges thus read out and the dark levels read out in advance outside the pixel region, for example.

Next, both of the voltage supply sources Drain_even and Drain_odd are set to a low level. In this state, the reset signal line RESET [2n] and the reset signal line RESET [2n+1] are set to a high level. In this way, the floating junctions FD corresponding to the photodiodes PDa and PDb on the "2+1" line are set to a low level whereby the amplifying transistors AMP are cut off. As a result, the pixel source follower circuits corresponding to the unit cells UC [2m, 2n] and UC [2m+2, 2n] on the "2n" line and the unit cell UC [2m+1, 2n+1] on the "2n+1" line are changed to be in an inactive state. The pixel source follower circuits corresponding to the unit cells UC [2m, 2n] and UC [2m+2, 2n] on the "2n" line return to be in the active state when the reset signal line RESET [2n] is set to a high level in order to read the signal charges outputted from the photodiodes PDa and PDb on the "2n" line after a lapse of a time period corresponding to one frame. Until then, these pixel source follower circuits are maintained to be in the inactive state.

Next, the reset signal lines RESET [2n+1] and RESET [2(n+1)] are sequentially set to a high level. Accordingly, the pixel source follower circuit of the unit cell UC [2m+1, 2n+1] is reactivated and the pixel source follower circuits of the unit cells UC [2m, 2 (n+1)] and UC [2m+2, 2n+1] are activated. Thereafter, the signal charges accumulated in the photodiodes PDa and PDb on the "2(n+1)" line are read out to the floating junctions FD by setting the read signal line READ [2(n+1)] to a high level.

Subsequently, the reading sequences similar to the case of the photodiodes PDa and PDb on the "2n+1" line are repeated.

According to the present embodiment, the voltage at the floating junction FD corresponding to the pixel (the photodiodes PDa and PDb) of the unit cell UC is designed to be boosted by utilizing the capacitive coupling between the floating junction FD and the vertical signal line Vsig. Therefore, setting the voltage higher than the voltage immediately after being reset by the resetting transistor RS is made easier.

Specifically, Non-patent Document 1 (FIGS. 4(a) to 4(c)) configured to set the voltage at the floating diffusion higher than the drain voltage as illustrated in FIGS. 4A to 4C, for example, has a problem in that only two-thirds of the gate capacitance of the amplifying transistor AMP can contribute to the boosting operation because the amplifying transistor AMP is operated in the pentode region (the saturated region) due to the potential difference between the drain (DRN) and the source (SIG) of the amplifying transistor AMP. However, the above-described configuration of the present embodiment can solve the above-described problem.

As described above, the voltage at the floating junction is allowed to be set to a voltage higher than the voltage immediately after being reset by the reset transistor RS by way of the capacitive coupling between the floating junction and the vertical signal line. Specifically, the unit cell is provided with the voltage supply source connected to the drain of the reset transistor and the voltage supply source connected to the drain of the amplifying transistor in order to supply different voltages respectively to the reset transistor and the amplifying transistor. In this way, it is possible to set the voltage at the floating junction to a high level at the boosting operation, irrespective of the gate capacitance of the amplifying transistor. Therefore, even when the space occupied by the gate electrode of the amplifying transistor is reduced along with the size reduction of the unit cell, it is possible to expand a dynamic range of the floating junction (or a charge amount storable in the floating junction).

In the present embodiment, the change in the voltage at the floating junction FD is determined by the above-described formula (2). Accordingly, it is preferable to set the capacitance value Camp of the gate capacitance C2 between the floating diffusion FD and the vertical signal line Vsig to be larger than the capacitance value Cfd of the capacitance C1 to ground of the floating diffusion FD (Camp>Cfd). Moreover, it is preferable to set (Vsig−BIAS) to a relatively large value.

Further, it is to be understood that the present invention is not limited only to each of the embodiments described above and that various modifications are possible in a practical phase without departing from the scope of the invention. In addition, each of the embodiments described above includes various phases of the invention, and thus, various aspects of the invention can be extracted by appropriately combining multiple constituents of those disclosed herein. For example, even if one or more constituents are deleted from all the constituents disclosed in each of the embodiments, such a configuration after deletion of the one or more constituents can also be extracted as an aspect of the technical advancement.

Another embodiment of the technological advancement discussed above includes a computer system that includes at least one computer readable medium or memory for holding instructions programmed to implement the above-described method and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, or any other medium from which a computer can read.

Stored on any one or on a combination of computer readable media, this exemplary embodiment may include software for controlling the computer system, and/or for driving a device or devices (i.e., a solid-state imaging device) for implementing the technological advancement. Such software may include, but is not limited to, device drivers, operating systems, development tools, and applications software.

The computer code devices of this embodiment may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

A computer readable medium may take many forms, including but not limited to, non-volatile media and volatile media. Non-volatile media includes, for example, optical, magnetic disks, and magneto-optical disks, such as the hard disk or the removable media drive. Volatile media includes dynamic memory, such as the main memory.

Various forms of computer readable media may be involved in carrying out one or more sequences of one or more instructions to processor for execution. For example, the instructions may initially be carried on a magnetic disk of a remote computer. The remote computer can load the instructions remotely into a dynamic memory and send the instructions over a telephone line using a modem. A modem local to the computer system may receive the data on the telephone line and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on storage device or either before or after execution by processor.

While the exemplary embodiments may be subject to various modifications and expressed in alternative forms, the embodiments discussed herein are non-limiting examples. It should be understood that the drawings and detailed description are not intended to limit the invention to the particular embodiments which are described. This disclosure is instead intended to cover all modifications, equivalents and alternatives falling within the scope of the present invention as defined by the appended claims.

What is claimed is:

1. A solid-state imaging device comprising:
a unit cell including,
   a photodiode configured to accumulate a signal charge obtained by photoelectric conversion of incident light,
   an amplifying transistor which includes a control electrode capacitively coupled to a vertical signal line, and configured to amplify the signal charge outputted from the photodiode and output the amplified signal charge to the vertical signal line, and
   a reset transistor configured to reset a voltage at the control electrode of the amplifying transistor;
a first power supply configured to supply a drain voltage to the amplifying transistor; and
a second power supply configured to supply a drain voltage to the reset transistor; and
a controller configured to
set the first power supply, which supplies the drain voltage to the amplifying transistor, and a voltage at the vertical signal line to a low level;
set the second power supply, which supplies the drain voltage to the reset transistor to a high level;
turn on the reset transistor on a first selection line so as to reset a voltage at the control electrode of the amplifying transistor;
turn off the reset transistor on the first selection line; and
increase the first power supply and a voltage at the vertical signal line, by setting the second power supply to a low level so as to change the voltage at the control electrode of the amplifying transistor on the first selection line.

2. The solid-state imaging device according to claim 1, wherein the unit cell includes a read transistor configured to control an accumulation of the signal charges of the photodiode.

3. The solid-state imaging device according to claim 2, wherein a source terminal of the reset transistor and a drain terminal of the read transistor are connected to the control electrode of the amplifying transistor.

4. The solid-state imaging device according to claim 2, wherein:
a plurality of the unit cells are arranged in an array, and the unit cell includes first and second photodiodes, and the read transistor includes a first read transistor configured to control an accumulation of a signal charge of the first photodiode, and a second read transistor configured to control an accumulation of a signal charge of the second photodiode.

5. The solid-state imaging device according to claim 4, wherein a drain terminal of the first read transistor and a drain terminal of the second read transistor are connected to the control electrode of the amplifying transistor.

6. The solid-state imaging device according to claim 4, wherein:
the unit cell includes a first unit cell arranged on an even-numbered column and a second unit cell arranged on an odd-numbered column,
the first unit cell is disposed on an even-numbered row, and the second unit cell is disposed on an odd-numbered row.

7. The solid-state imaging device according to claim 6, wherein:

the first photodiode of the first unit cell and the second photodiode of the second unit cell are disposed on an even-numbered row, and the second photodiode of the first unit cell and the first photodiode of the second unit cell are disposed on an odd-numbered row.

8. The solid-state imaging device according to claim 6, wherein:

the first power supply is configured to supply a drain voltage to the reset transistor of the second unit cell; and the second power supply configured to supply a drain voltage to the amplifying transistor of the second unit cell.

9. The solid-state imaging device according to claim 1, wherein a capacitance value between the control electrode of the amplifying transistor and the vertical signal line is larger than a capacitance value between a ground and the control electrode of the amplifying transistor.

10. The solid-state imaging device according to claim 1, further comprising:

a vertical signal line control circuit including,
a biasing transistor configured to fix the voltage at the vertical signal line, and including a drain terminal connected to the vertical signal line, a source terminal connected to a third power supply and a gate terminal,
a control signal line connected to the gate terminal of the biasing transistor,
a current source coupled to a ground,
a load transistor including a source terminal connected to the vertical signal line, a drain terminal connected to the current source, and a gate terminal, and
a select signal line connected to the gate terminal of the load transistor.

11. A method of driving a solid-state imaging device comprising:

setting a first power supply, which supplies a drain voltage to a first amplifying transistor of the imaging device, and a voltage at a first vertical signal line of the imaging device, to a low level;

setting a second power supply, which supplies a drain voltage to a first reset transistor of the imaging device, to a high level;

turning on the first reset transistor on a first selection line so as to reset a voltage at a control electrode of a the first amplifying transistor;

turning off the first reset transistor on the first selection line; and increasing the first power supply and a voltage at the first vertical signal line so as to change the voltage at the control electrode of the first amplifying transistor on the first selection line, wherein the increasing the first power supply and the voltage at the first vertical signal line includes setting the second power supply to a low level.

12. The method according to claim 11, further comprising:

setting the first power supply to a high level, and the second power supply and a voltage at a second vertical signal line to a low level;

turning on a second reset transistor on a second selection line so as to reset a voltage at a control electrode of a second amplifying transistor;

turning off the second reset transistor on the second selection line; and increasing the second power supply and the voltage at the second vertical signal line so as to change the voltage at the control electrode of the second amplifying transistor on the second selection line.

13. The method according to claim 12, wherein the increasing the second power supply and the voltage at the second vertical signal line includes setting the first power supply to a low level.

14. The method according to claim 12, wherein:

the first reset transistor and the first amplifying transistor are disposed on an even-numbered row and column, and the second reset transistor and the second amplifying transistor are disposed on an odd-numbered row and column.

15. The method according to claim 11, wherein the increasing the first power supply and the voltage at the first vertical signal line includes capacitively coupling a control electrode of the first amplifying transistor to a vertical signal line.

16. The method according to claim 15, wherein a capacitance value between the control electrode of the first amplifying transistor and the first vertical signal line is larger than a capacitance value between a ground and the control electrode of the first amplifying transistor.

17. A non-transitory computer readable medium encoded with instructions, which when executed by a computer cause the computer to implement a method of driving a solid-state imaging device comprising:

setting a first power supply, which supplies a drain voltage to a first amplifying transistor of the imaging device, and a voltage at a first vertical signal line of the imaging device, to a low level;

setting a second power supply, which supplies a drain voltage to a first reset transistor of the imaging device, to a high level;

turning on the first reset transistor on a first selection line so as to reset a voltage at a control electrode of a the first amplifying transistor;

turning off the first reset transistor on the first selection line; and increasing the first power supply and a voltage at the first vertical signal line so as to change the voltage at the control electrode of the first amplifying transistor on the first selection line, wherein the increasing the first power supply and the voltage at the first vertical signal line includes setting the second power supply to a low level.

18. The computer readable medium according to claim 17, wherein the increasing the first power supply and the voltage at the first vertical signal line includes capacitively coupling a control electrode of the first amplifying transistor to a vertical signal line.

19. The computer readable medium according to claim 18, wherein a capacitance value between the control electrode of the first amplifying transistor and the first vertical signal line is larger than a capacitance value between a ground and the control electrode of the first amplifying transistor.

* * * * *